G. MANN, Jr.
SAFETY GUARD FOR BOILERS.

No. 32,572.  Patented June 18, 1861.

Witnesses.

Inventor.
George Mann Jr
per Munn & Co
Attorneys.

UNITED STATES PATENT OFFICE.

GEO. MANN, JR., OF OTTAWA, ILLINOIS.

SAFETY-GUARD FOR STEAM-BOILERS.

Specification of Letters Patent No. 32,572, dated June 18, 1861.

*To all whom it may concern:*

Be it known that I, GEORGE MANN, Jr., of Ottawa, in the county of Lasalle and State of Illinois, have invented a new and Improved Safety-Guard for Steam-Boilers; and I do hereby declare that the following is a full, clear, and exact description of the same, reference being had to the accompanying drawings, forming part of this specification, in which—

Figure 1:
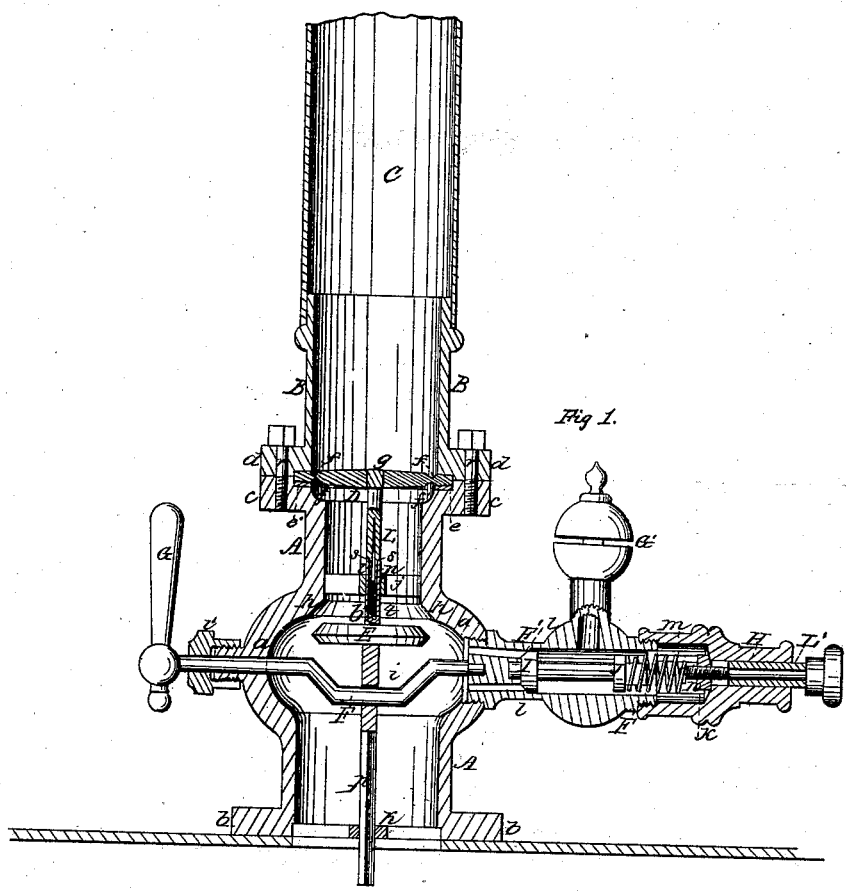
Figure 2:
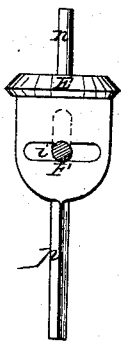

Figure 1 is a central vertical section of the safety guard. Fig. 2 is a side view of the valve.

Similar letters of reference indicate corresponding parts in both figures.

My invention consists in a novel construction and arrangement for application to a steam boiler of a metallic disk or plate, weaker than any part of the boiler, to be burst and blown away when the pressure in the boiler rises to near a dangerous point.

It also consists in the arrangement of a fusible plug in said disk or plate.

It also consists in the employment below and in combination with such disk or plate of a valve so applied as to be capable of closing the boiler after the blowing away of such disk or plate to permit the said disk or plate to be replaced by a new one without waiting for the steam to subside in the boiler.

It also consists in combining the said valve with the said disk or plate by means of a guard pin which prevents the closing of the valve while the said disk or plate remains perfect, and it further consists in a certain arrangement of a steam whistle or other alarm, and a pressure valve in combination with such disk or plate whereby an alarm may be given before the pressure of the steam becomes so high as to cause the explosion of the said disk or plate.

To enable those skilled in the art to make and use my invention I will proceed to describe its construction and operation.

A is a short tubular column having a spherical enlargement as shown at $a$, $a$, and flanches $b$, $c$, at bottom and top intended to be placed in an upright position over an opening in the upper part of a boiler to which it is to be bolted by screw-bolts passing through its lower flanch $b$.

B is a short tube having its interior as large or somewhat larger than the interior of the upper part of the column A, set upright on the said casting and provided with a flanch $d$, at its lower end which is bolted to the flanch $c$, by bolts $r$, $r$. This tube B, has attached to it a pipe C, of the same or of a larger internal diameter and of any length.

D is the safety disk whose margin rests upon an india rubber gasket $e$, in a recess provided in the upper part of the column A, and is clamped between the said casting and the tube B, the india rubber gasket making the joint steam-tight. The said disk may be made of boiler-plate or other metal, and has a concentric groove $f$, turned or cast in each side to reduce its strength just within the circles of the tube B, and column A, to such a degree as shall have been proved by experiment to make it capable of being burst or torn apart by a pressure of steam less than the highest which the boiler is capable of bearing with safety. The grooved portion of the disk being the weakest portion, when the disk gives way it does so in that portion, and the whole of the portion within the grooves is torn out and blown through the tube B, and pipe C, leaving an opening for the escape of steam nearly equal to the whole area of the said tube and pipe. The disk D, has a hole drilled in the center for the reception of a fusible plug $g$, which is of such metal or alloy as to be melted by a heat due to the same or a less pressure of steam than is sufficient to explode the disk, so that it is only in case of the failure of the fusible plug to melt or the failure of its fusion to afford a sufficient relief, that the disk will be burst. The disk constitutes a very convenient receptacle for the fusible plug as by unscrewing and removing the tube B, the plug can be replaced by a new one. The removal of the said tube is also necessary when the disk requires to be replaced by a new one.

E is a puppet valve arranged within the column A, to close upward against a seat $n$, $n$, within the said casting, and having a horizontal slot $i$, in a flattened portion of its stem for the reception of a crank F, one end of which is fitted to a bearing provided for it in one side of the column A, and the other end of which passes through a stuffing-box $i'$, in the opposite side of the column, and is furnished outside with a lever G, by which to turn it to open and close the valve E. The stem $p$, of the said valve is fitted to guides $j$, and $k$, within the column A; and the said stem is made hollow and open at the top for the reception of the guard pin L, which is to prevent the valve from being closed until the disk or plate has been burst or blown away and thus to place the apparatus beyond the control of the engineer. The pin L, is made with a shoulder s, near the bottom, and is split to make it externally elastic that it may be forced past its shoulder s, into the valve stem. A spiral spring t, is applied within the stem to press the pin L, upward. When the valve is opened the spring t, forces up the pin L, from the valve-stem and brings the shoulder s, above the stem and the lateral elasticity of the stem keeps it so spread that the shoulder cannot enter the stem again and hence the pin coming in contact with the disk or plate g, prevents the closing of the valve. When the disk or plate has been blown away the valve is to be closed, and in order to permit the replacement of the disk or plate while the valve remains closed it is necessary to press the sides of the pin L, together sufficiently to allow the shoulder s, to pass down into the valve stem. When the disk has been replaced and the valve opened the spring t, forces out the pin until the shoulder s, comes above the valve stem.

F' is a horizontal socket screwed into one side of the column A, having on the top of it a steam whistle G', and having screwed on to its outer end a cap H. Within this socket F', is a puppet valve I, and its seat l, said valve closing by a movement toward the column A. To the stem of this valve is attached a piston J, against which bears a spiral spring m, whose pressure on the said piston and valve is adjusted by a screw K, which passes through the head of the cap H, and screws into a loose nut n, placed within the cap, said nut being held in place and prevented from turning by the pressure of the spring holding it in a suitably formed recess in the interior of the head of the cap. The screw is made with a long neck which is fitted with a square sleeve L', which is fitted to slide through a square hole in the head. This sleeve is so fitted to the neck of the screw as to prevent it moving longitudinally thereon so that it moves with the screw as the latter is screwed in or out to increase or diminish the tension of the spring and pressure on the valve I. The said sleeve has upon its exterior a graduated scale upon which the outer edge of the head of the cap marks the pressure produced on the valve by the spring. The screw K, is adjusted to make the spring produce a pressure on the valve I, less than that to which there is due a temperature sufficient to fuse the plug g, or burst the disk or plate so that the said valve may be opened and an alarm sounded by the whistle before the pressure in the boiler is high enough to fuse the plug. The fusion of the plug and bursting of the disk or plate can therefore only take place in case of neglect to take notice of the alarm, or the sticking of the valve I.

Instead of a single disk or plate D, several of such disks or plates may be used, and such disks or plates may be secured within openings in a larger plate applied and arranged within a column in substantially the same manner as that in which the disk or plate D, is applied in the column A B.

I do not claim broadly the fitting of a boiler with a plate so much weaker than any portion of the boiler itself as to be burst by a pressure below the highest which may be carried by the boiler with safety; but

What I claim as my invention, and desire to secure by Letters Patent, is:—

1. The employment of one or more explosive disks or plates D, constructed as described with a concentric groove, or grooves f, f, near the margin and applied substantially as herein specified in combination with the fusible plug (g) as set forth.

2. The valve E, applied below and in combination with the explosive disk D, substantially as and for the purpose herein set forth.

3. The alarm whistle G, and pressure valve I, employed in connection with the disk D, substantially as and for the purpose herein described.

4. The guard pin L, applied in combination with the valve E, and disk or plate D, substantially as and for the purpose herein specified.

GEORGE MANN, Jr.

Witnesses:
 A. A. FISHER,
 HENRY HISE.